US010064163B2

(12) United States Patent
Uemura et al.

(10) Patent No.: US 10,064,163 B2
(45) Date of Patent: Aug. 28, 2018

(54) TERMINAL APPARATUS, BASE STATION APPARATUS, COMMUNICATION SYSTEM, CONTROL METHOD, AND INTEGRATED CIRCUIT

(71) Applicant: SHARP KABUSHIKI KAISHA, Osaka (JP)

(72) Inventors: Katsunari Uemura, Osaka (JP); Yasuyuki Kato, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/900,917

(22) PCT Filed: Jun. 27, 2014

(86) PCT No.: PCT/JP2014/067196
§ 371 (c)(1),
(2) Date: Dec. 22, 2015

(87) PCT Pub. No.: WO2014/208732
PCT Pub. Date: Dec. 31, 2014

(65) Prior Publication Data
US 2016/0157219 A1    Jun. 2, 2016

(30) Foreign Application Priority Data
Jun. 27, 2013    (JP) ................. 2013-134650

(51) Int. Cl.
*H04W 72/04* (2009.01)
*H04W 16/00* (2009.01)
(Continued)

(52) U.S. Cl.
CPC ....... *H04W 72/0406* (2013.01); *H04L 5/0053* (2013.01); *H04W 16/00* (2013.01);
(Continued)

(58) Field of Classification Search
CPC .......... H04W 72/0406; H04W 72/042; H04W 72/0413; H04W 76/046; H04W 74/0833; H04L 5/0001
See application file for complete search history.

(56) References Cited

U.S. PATENT DOCUMENTS 8,917,664 B2 * 12/2014 Jang ..................... H04W 24/10
370/310
9,326,211 B2 *  4/2016 Kaur ................. H04W 36/0072
(Continued)

FOREIGN PATENT DOCUMENTS

CN        102932908 A      2/2013
WO    WO 2013/024743 A1   2/2013

OTHER PUBLICATIONS

Ericsson, ST Ericsson, "TA grouping mechanism", 3GPP TSG-RAN WG2 #76, R2-116087, San Francisco, USA, Nov. 14-18, 2011, pp. 1-2.
(Continued)

*Primary Examiner* — Jamal Javaid
(74) *Attorney, Agent, or Firm* — Birch, Stewart, Kolasch & Birch, LLP

(57) ABSTRACT

Provided is a technique related to a terminal apparatus, a base station apparatus, a communication system, a control method, and an integrated circuit which realize procedure of efficiently controlling a state of a cell for a plurality of cells. The terminal apparatus using a plurality of cells divides the plurality of cells into groups based on group identification information transmitted from the base station apparatus, receives control information indicating a change of a cell state of at least one of the cells, and controls the state of the cell based on bit map information and the group identification information, which are included in the control information and indicate the cell the state of which is to be changed.

4 Claims, 8 Drawing Sheets

(51) Int. Cl.
  *H04W 52/02* (2009.01)
  *H04W 76/27* (2018.01)
  *H04W 88/08* (2009.01)
  *H04L 5/00* (2006.01)

(52) U.S. Cl.
  CPC ....... *H04W 52/0206* (2013.01); *H04W 76/27* (2018.02); *H04L 5/0001* (2013.01); *H04W 88/08* (2013.01); *Y02D 70/00* (2018.01); *Y02D 70/1242* (2018.01); *Y02D 70/24* (2018.01); *Y02D 70/25* (2018.01)

(56) References Cited

U.S. PATENT DOCUMENTS

| | | | |
|---|---|---|---|
| 2014/0192775 A1* | 7/2014 | Li | H04W 36/0072 370/331 |
| 2014/0194126 A1 | 7/2014 | Tsuboi et al. | |
| 2014/0198762 A1 | 7/2014 | Yang et al. | |

OTHER PUBLICATIONS

Ericsson, ST-Ericsson, Huawei, "TA regrouping by reconfiguration", 3GPP TSG-RAN WG2 #79, R2-123809, Qingdao, China, Aug. 13-17, 2012, pp. 1-4.

MediaTek Inc., "Control Plane Architecture", 3GPP TSG-RAN2 #82 Meeting, R2-131778, Fukuoka, Japan, May 20-24, 2013, pp. 1-3.

NTT DOCOMO Inc., "Deployment scenarios and design goals for dual connectivity", 3GPP TSG-RAN WG2 #81, R2-130444, St. Julian's, Malta, Jan. 28-Feb. 1, 2013, pp. 1-6.

* cited by examiner

Activation/Deactivation MAC-CE for GID

Activation/Deactivation MAC-CE for GID#0

(a)

Activation/Deactivation MAC-CE for GID#1

(b)

(a)

(b)

TERMINAL APPARATUS, BASE STATION APPARATUS, COMMUNICATION SYSTEM, CONTROL METHOD, AND INTEGRATED CIRCUIT

TECHNICAL FIELD

Embodiments of the present invention relate to a technique of a terminal apparatus, a base station apparatus, a communication system, a control method, and an integrated circuit which realizes procedure of efficiently controlling a state of a cell.

This application claims priority based on Japanese Patent Application No. 2013-134650 filed in Japan on Jun. 27, 2013, the content of which is incorporated herein.

BACKGROUND ART

In 3GPP (3rd Generation Partnership Project) which is a standardization project, standardization of Evolved Universal Terrestrial Radio Access (hereinafter referred to as EUTRA) is performed, in which high speed communication is realized by adopting an OFDM (Orthogonal Frequency-Division Multiplexing) communication scheme and flexible scheduling with a predetermined frequency and time unit called a resource block.

Moreover, in the 3GPP, a discussion on Advanced EUTRA that realizes higher-speed data transmission and has an upward compatibility with the EUTRA has been carried out. In the EUTRA, a communication system is premised to have a network in which base station apparatuses are composed of substantially the same cell configurations (cell sizes), but in the Advanced EUTRA, a discussion has been carried out on a communication system that is premised to have a network (Heterogeneous Network) in which base station apparatuses (cells) having different configurations are mixed in a same area.

A technique that, in a communication system in which cells (macro cells) having a large cell radius and cells (small cells) having a smaller cell radius than that of the macro cells are arranged like the heterogeneous network, a terminal apparatus performs communication by connecting to the macro cells and the small cells at the same time (dual connectivity) is discussed (NPL 1).

In NPL 1, discussion has been carried out with a network premised that when a terminal apparatus tries to realize dual connectivity with a cell (macro cell) having a large cell radius (cell size) and a cell (small cell) having a small cell radius, a delay is caused because of low speed of a backbone line (Backhaul) between the macro cell and the small cell. That is, when control information or user information which is exchanged between the macro cell and the small cell is delayed, the function which has been able to be realized conventionally in the dual connectivity may become unable to be realized or difficult to be realized.

For example, though one base station apparatus has centrally controlled packet scheduling of a plurality of cells conventionally, in the case of performing such centralized control in the network in which there is a delay in the backbone line, optimum scheduling in which wireless condition is reflected may not be performed. Thus, a method for controlling packet scheduling in a distributed manner by causing both of a base station apparatus of a macro cell and a base station apparatus of a small cell to have a dynamic resource allocation function is being discussed (NPL 2).

CITATION LIST

Non Patent Document

[NON PATENT DOCUMENT 1] R2-130444, NTT DOCOMO, INC., 3GPP TSG RAN2#81, St. Julian's, Malta, Jan. 28-Feb. 1, 2013. http://www.3gpp.org/ftp/tsg_ran/WG2_RL2/TSGR2_81/Docs/

[NON PATENT DOCUMENT 2] R2-131778, MediaTek Inc., 3GPP TSG RAN2#82, Fukuoka, Japan, May 20-24, 2013. http://www.3gpp.org/ftp/tsg_ran/WG2_RL2/TSGR2_82/Docs/

DISCLOSURE OF THE INVENTION

Problems to be Solved by the Invention

As described in, for example, NPL 2, by performing distributed packet scheduling between the base station apparatuses, a terminal apparatus may transmit feedback information directly to each of the base station apparatuses without using a backbone line between the base station apparatuses. However, when the base station apparatuses perform the distributed packet scheduling, a problem is caused that states of cells managed by the base station apparatuses are difficult to be grasped mutually.

That is, when different base station apparatuses are connected by dual connectivity, as to states of a plurality of cells allocated to a terminal apparatus, each of the base station apparatuses may grasp (recognize) states of cells managed by the base station apparatus itself, but it is difficult to grasp states of cells managed by the other base station apparatuses. Thus, inconsistency of the state may occur in the states of the cells between the base station apparatuses and the terminal apparatus.

More specifically, since each base station apparatus may not grasp the states of the cells which are not managed by the base station apparatus itself, the base station apparatuses may deactivate a cell which is being activated (under scheduling), or may activate a cell which is being deactivated (not under scheduling) to the contrary. In this manner, when it is difficult to control states of cells for a terminal apparatus intensively by one base station apparatus, such a problem is caused that scheduling of the base station apparatuses becomes inefficient and a throughput of the terminal apparatus is reduced.

An object of embodiments of the invention is to solve at least one of the problems described above by providing a technique related to a terminal apparatus, a base station apparatus, a communication system, a control method, and an integrated circuit capable of realizing procedure of efficiently controlling a state of a cell.

Means for Solving the Problems

In order to achieve the aforementioned object, the following means is taken. That is, a terminal apparatus in an embodiment of the invention is a terminal apparatus using a plurality of cells, dividing the plurality of cells into a plurality of cell groups based on information transmitted from a base station apparatus, receiving control information indicating a change of a state of at least one of the cells, which is transmitted from the base station apparatus, and changing the state of the cell in a cell group in which the control information is received.

Moreover, in the terminal apparatus in the embodiment of the invention, based on the control information transmitted from the base station apparatus, the state of the cell may be changed to activation or deactivation in the cell group in which the control information is received.

Moreover, in the terminal apparatus in the embodiment of the invention, the state of the cell may be controlled by using only bit information of the control information transmitted from the base station apparatus, which corresponds to the cell in the cell group in which the control information is received.

In this manner, by appropriately changing each cell state of the plurality of cells, which are configured to a terminal apparatus, based on the control information indicating a change of the cell state, which is received from the base station apparatus, the terminal apparatus is able to improve efficiency of the control for the change of the state of the cell.

Moreover, a base station apparatus in an embodiment of the invention is a base station apparatus being connected to a terminal apparatus by using a plurality of cells, transmitting information for causing the plurality of cells to be divided into a plurality of cell groups to the terminal apparatus, generating control information indicating a change of a state of at least one of the cells, and transmitting the generated control information for each of the cell groups.

Moreover, in the base station apparatus in the embodiment of the invention, based on a cell group to which the cell whose state is to be changed belongs, the control information may be transmitted to a cell of any of the cell groups.

Moreover, in the base station apparatus in the embodiment of the invention, the state of the cell in the cell group of the terminal apparatus may be changed to activation or deactivation by transmitting the control information.

In this manner, by appropriately transmitting the control information indicating the change of the cell state for each cell state of the plurality of cells, which are configured to the terminal apparatus, the base station apparatus is able to improve efficiency of the control for the change of the state of the cell.

Moreover, a communication system in an embodiment of the invention is a communication system composed of a terminal apparatus and a base station apparatus which are connected by using a plurality of cells, in which the base station apparatus transmits information for causing the plurality of cells to be divided into a plurality of cell groups to the terminal apparatus, generates control information indicating a change of a state of at least one of the cells, and transmits the generated control information for each of the cell groups, and the terminal apparatus divides the plurality of cells into the plurality of cell groups based on the information transmitted from the base station apparatus, receives the control information indicating the change of the state of at least one of the cells, which is transmitted from the base station apparatus, and changes the state of the cell in a cell group in which the control information is received.

In this manner, by appropriately transmitting the control information indicating the change of the cell state for each cell state of the plurality of cells, which are configured to the terminal apparatus, in the base station apparatus, and by appropriately changing each cell state of the plurality of cells, which are configured to the terminal apparatus, based on the control information indicating the change of the state of the cell, which is received from the base station apparatus, in the terminal apparatus, the communication system is able to improve efficiency of the control for the change of the state of the cell.

Moreover, a control method in an embodiment of the invention is a control method of a terminal apparatus using a plurality of cells, including, in the terminal apparatus, at least: a step of dividing the plurality of cells into a plurality of cell groups based on information transmitted from a base station apparatus, a step of receiving control information indicating a change of a state of at least one of the cells, which is transmitted from the base station apparatus, and a step of changing the state of the cell in a cell group in which the control information is received.

In this manner, by including the step of appropriately changing each cell state of the plurality of cells, which are configured to the terminal apparatus, based on the control information indicating the change of the state of the cell, which is received from the base station apparatus, the control method of the terminal apparatus is able to improve efficiency of the control for the change of the state of the cell.

Moreover, a control method in an embodiment of the invention is a control method of a base station apparatus which is connected to a terminal apparatus by using a plurality of cells, including, in the base station apparatus, at least: a step of transmitting information for causing the plurality of cells to be divided into a plurality of cell groups to the terminal apparatus, a step of generating control information indicating a change of a state of at least one of the cells, and a step of transmitting the generated control information for each of the cell groups.

In this manner, by including the step of appropriately transmitting the control information indicating the change of the cell state for each cell of the plurality of cells, which are configured to the terminal apparatus, the control method of the base station apparatus is able to improve efficiency of the control for the change of the state of the cell.

Moreover, an integrated circuit in an embodiment of the invention is an integrated circuit mounted in a terminal apparatus using a plurality of cells, causing the terminal apparatus to exert, in the terminal apparatus, a series of functions including at least: dividing the plurality of cells into a plurality of cell groups based on information transmitted from a base station apparatus, receiving control information indicating a change of a state of at least one of the cells, which is transmitted from the base station apparatus, and changing the state of the cell in a cell group in which the control information is received.

In this manner, by causing the function of appropriately changing each cell state of the plurality of cells, which are configured to the terminal apparatus, based on the control information indicating the change of the state of the cell, which is received from the base station apparatus, to be exerted, the integrated circuit mounted in the terminal apparatus is able to improve efficiency of the control for the change of the state of the cell.

Moreover, an integrated circuit in an embodiment of the invention is an integrated circuit mounted in a base station apparatus which is connected to a terminal apparatus by using a plurality of cells, causing the base station apparatus to exert, in the base station apparatus, a series of functions including at least: transmitting information for causing the plurality of cells to be divided into a plurality of cell groups to the terminal apparatus, generating control information indicating a change of a state of at least one of the cells, and transmitting the generated control information for each of the cell groups.

In this manner, by causing the function of appropriately transmitting the control information indicating the change of the cell state for each cell state of the plurality of cells, which are configured to the terminal apparatus, to be exerted, the integrated circuit mounted in the base station apparatus is able to improve efficiency of the control for the change of the state of the cell.

In this specification, although each embodiment is disclosed in terms of a technique related to a terminal apparatus, a base station apparatus, a communication system, a control method, and an integrated circuit which realize procedure of efficiently controlling a state of a cell, a communication scheme which may be applied to each embodiment is not limited to EUTRA or a communication scheme having upward compatibility with EUTRA such as Advanced EUTRA.

For example, the technique described in this specification may be used in various communication systems using code division multiple access (CDMA), time division multiple access (TDMA), frequency division multiple access (FDMA), orthogonal FDMA (OFDMA), single carrier FDMA (SC-FDMA), other access scheme, and the like. In addition, in this specification, a system and a network may be used synonymously.

Effects of the Invention

According to the embodiments of the invention, it is possible to provide a technique related to a terminal apparatus, a base station apparatus, a communication system, a control method, and an integrated circuit capable of efficiently performing procedure of controlling a state of a cell.

MODE FOR CARRYING OUT THE INVENTION

Figure 1:
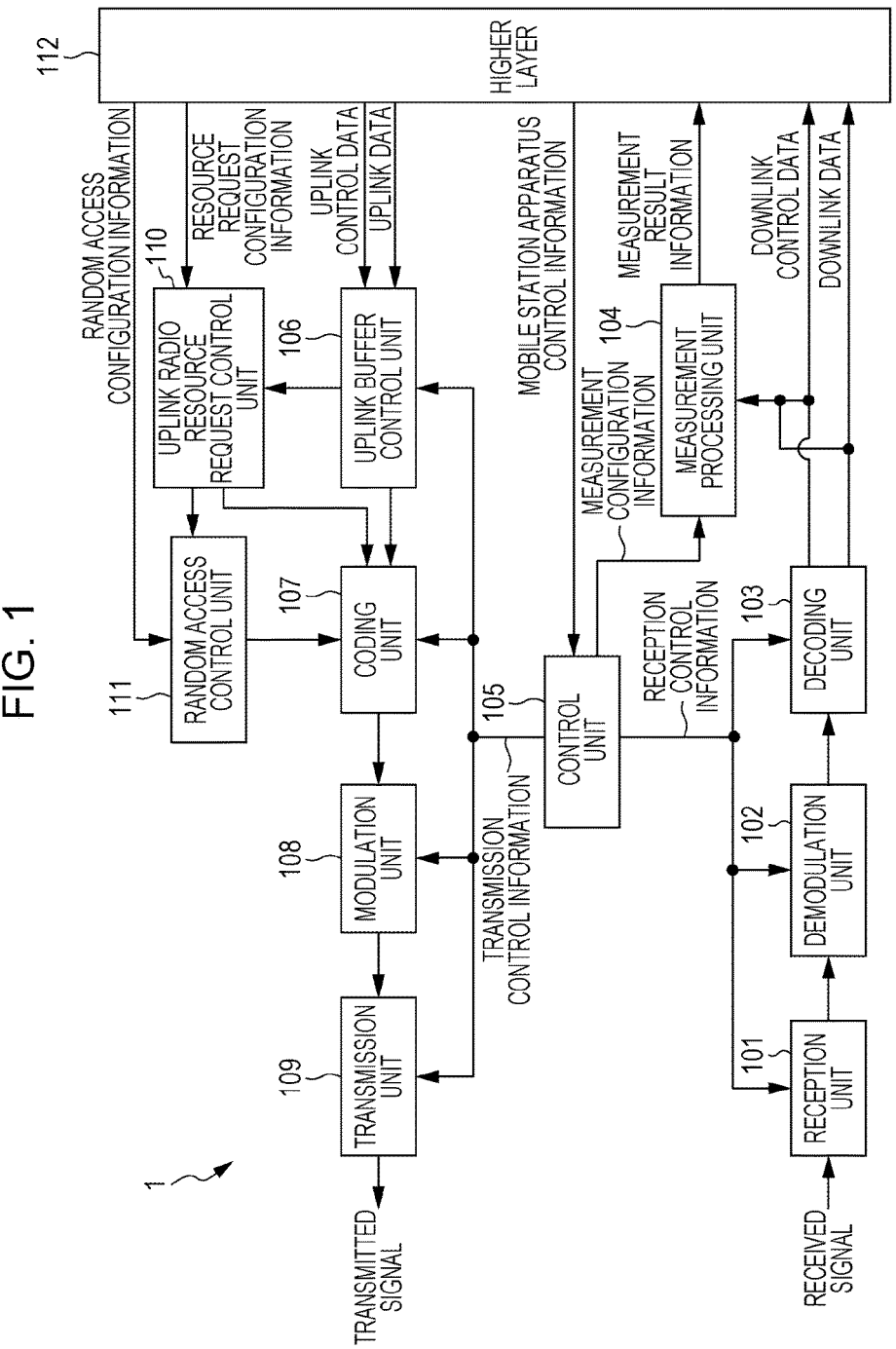
FIG. 1 is a block diagram illustrating one example of a schematic configuration of a terminal apparatus according to an embodiment of the invention.

A technique related to each embodiment of the invention will be briefly described below.

[Physical Channel/Physical Signal]

Description will be given for a physical channel and a physical signal which are primarily used in EUTRA and Advanced EUTRA. A channel means a medium used for signal transmission, and a physical channel means a physical medium used for signal transmission. In the invention, a physical channel and a signal may be used synonymously. There is a possibility that in the EUTRA and the Advanced EUTRA, a physical channel is added or a structure or a format style thereof is modified or added in the future, but, even in the case of modification or addition, there is no influence on description of each embodiment of the invention.

In the EUTRA and the Advanced EUTRA, scheduling of the physical channel or the physical signal is managed by using a radio frame. One radio frame is 10 ms and one radio frame consists of ten subframes. Further, one subframe is configured by two slots (that is, one subframe has 1 ms and one slot has 0.5 ms). Moreover, management is performed by using a resource block as a minimum unit of scheduling, in which physical channels are arranged. The resource block is defined as a fixed frequency domain in which a frequency axis is configured by an assembly of a plurality of subcarriers (for example, twelve subcarriers) and a domain configured by a fixed transmission time interval (one slot).

Synchronization signals are configured by three types of primary synchronization signals and secondary synchronization signals which are configured by 31 types of codes which are arranged alternately in a frequency domain, and a combination of signals of the primary synchronization signals and the secondary synchronization signals indicates 504 cell identifiers (physical cell ID (Physical Cell Identity; PCI)) that identify a base station apparatus and a frame timing for radio synchronization. A terminal apparatus specifies a physical cell ID of synchronization signals received by cell search.

A physical broadcast channel (PBCH) is transmitted for the purpose of notifying (configuring) a control parameter (broadcast information (system information)) which is commonly used in terminal apparatuses in a cell. Regarding broadcast information which is not notified by the physical broadcast channel, a radio resource whose broadcast information is transmitted is notified to the terminal apparatus in a cell by a physical downlink control channel, and in the notified radio resource, a layer 3 message (system information) for notifying the broadcast information is transmitted by a physical downlink shared channel.

As the broadcast information, a cell global identifier (CGI) indicating an identifier of an individual cell, a tracking area identifier (TAI) for managing a standby area by paging, random access configuration information (transmission timing timer or the like), shared radio resource configuration information in the cell, neighboring cell information, uplink access limit information or the like is notified.

Downlink reference signals are classified into a plurality of types depending on intended use thereof. For example, cell-specific RSs (cell-specific reference signals) are pilot signals which are transmitted with predetermined power for each cell, and are downlink reference signals which are iterated periodically in a frequency domain and a time domain based on a predetermined rule. The terminal apparatus measures reception quality for each cell by receiving the cell-specific RSs. Moreover, the terminal apparatus uses the downlink cell-specific RSs also as reference signals for demodulation of the physical downlink control channel or the physical downlink shared channel that is transmitted at the same time with the cell-specific RSs. As a sequence used for the cell-specific RSs, a sequence which is identifiable for each cell is used.

The downlink reference signals are used also for estimation of channel fluctuation of the downlink. The downlink reference signals used for estimation of channel fluctuation is referred to as channel state information reference signals (CSI-RSs). The downlink reference signals which are configured individually to the terminal apparatus is referred to as UE specific reference signals (URSs), or dedicated RSs (DRSs), and referred to for channel compensation processing of a channel when the physical downlink control channel, or the physical downlink shared channel is demodulated.

The physical downlink control channel (PDCCH) is transmitted in several OFDM symbols (for example, 1 to 4 OFDM symbols) from beginning of each subframe. The enhanced physical downlink control channel (EPDCCH) is a physical downlink control channel which is arranged in an OFDM symbol in which the physical downlink shared channel PDSCH is arranged. The PDCCH or the EPDCCH is used for the purpose of notifying radio resource allocation information in accordance with scheduling of a base station apparatus and information for giving instruction of an adjustment amount of increase and decrease in transmit power to the terminal apparatus. Hereinafter, when simply described as the physical downlink control channel (PDCCH), it means both physical channels of the PDCCH and the EPDCCH unless otherwise specified.

The terminal apparatus needs to acquire radio resource allocation information called uplink grant in a case of transmission and downlink grant (downlink assignment) in a case of reception from the physical downlink control channel by monitoring the physical downlink control channel addressed to the terminal apparatus itself before transmitting or receiving a layer 3 message (paging, hand-over command, and the like) that is downlink data or downlink control data, and by receiving the physical downlink control channel addressed to the terminal apparatus. Note that, the physical downlink control channel may be configured so as to be, other than to be transmitted in the OFDM symbols described above, transmitted in a domain of a resource block allocated from the base station apparatus to the terminal apparatus in an individual (dedicated) manner.

A physical uplink control channel (PUCCH) is used for performing a reception confirmation response (ACK/NACK; Acknowledgement/Negative Acknowledgement) of data transmitted on the physical downlink shared channel, channel (channel state) information (CSI; Channel State Information) of the downlink, and a radio resource allocation request (radio resource request, scheduling request (SR)) of the uplink.

CSI includes a CQI (Channel Quality Indicator), a PMI (Precoding Matrix Indicator), a PTI (Precoding Type Indicator), and an RI (Rank Indicator). Each indicator may be described as indication.

The physical downlink shared channel (PDSCH) is used also for notifying the terminal apparatus of, in addition to downlink data, broadcast information (system information) which is not notified by paging or the physical broadcast channel as the layer 3 message. Radio resource allocation information of the physical downlink shared channel is indicated by the physical downlink control channel. The physical downlink shared channel is arranged and transmitted in the OFDM symbol other than the OFDM symbol in which the physical downlink control channel is transmitted. That is, the physical downlink shared channel and the physical downlink control channel are subjected to time division multiplexing in one subframe.

A physical uplink shared channel (PUSCH) mainly transmits uplink data and uplink control data, and may include control data such as reception quality of downlink and ACK/NACK. Moreover, it is used also for notifying the base station apparatus of uplink control information, in addition to the uplink data, as the layer 3 message from the terminal apparatus. Similarly to the case of the downlink, radio resource allocation information of the physical uplink shared channel is indicated by the physical downlink control channel.

An uplink reference signal (also referred to as an uplink pilot signal or an uplink pilot channel) includes a demodulation reference signal (DMRS) which is used by the base station apparatus for demodulating the physical uplink control channel PUCCH and/or the physical uplink shared channel PUSCH, and a sounding reference signal (SRS) which is used by the base station apparatus mainly for estimating a channel state of the uplink. As the sounding reference signal, there are a periodic sounding reference signal (Periodic SRS) which is transmitted periodically and an aperiodic sounding reference signal (Aperiodic SRS) which is transmitted when an instruction is given from the base station apparatus.

A physical random access channel (PRACH) is a channel which is used for notifying (configuring) a preamble sequence and has a guard time. The preamble sequence is configured so as to notify the base station apparatus of information by a plurality of sequences. For example, when sixty four types of sequences are prepared, it is possible to indicate 6-bit information to the base station apparatus. The physical random access channel is used as access means to the base station apparatus from the terminal apparatus.

The terminal apparatus uses the physical random access channel, for example, for making a radio resource request of the uplink when the physical uplink control channel is not configured, or requesting transmission timing adjustment information (also called timing advance (TA)) which is required for aligning an uplink transmission timing to a reception timing window of the base station apparatus to the base station apparatus. Moreover, the base station apparatus may request the terminal apparatus to initiate random access procedure by using the physical downlink control channel.

The layer 3 message is a message handled by a protocol of a control-plane (CP (C-Plane)) which is exchanged between RRC (radio resource control) layers of the terminal apparatus and the base station apparatus, and may be used synonymously with RRC signaling or an RRC message. Note that, against the control-plane, a protocol handling user data is referred to as a user-plane (UP (U-Plane)).

Note that, since physical channels or physical signals other than above are not concerned with each embodiment of the invention, detailed description thereof will be omitted. Examples of the physical channels and the physical signals whose description will be omitted include a physical control format indicator channel (PCFICH), a physical HARQ indicator channel (PHICH: Physical hybrid ARQ indicator channel), and a physical multicast channel (PMCH).

[Radio Network]

A communication available range (communication area) of each frequency which is controlled by the base station apparatus is regarded as a cell. In this case, respective communication areas covered by the base station apparatus may have different areas and different shapes for each frequency. Moreover, communication areas which are covered may be different for each frequency. A radio network in which cells which are different in types of base station apparatuses and sizes of cell radius are mixed in communication areas with the same frequency or different frequencies to form one communication system is referred to as a heterogeneous network.

The terminal apparatus operates by regarding inside of a cell as a communication area. When the terminal apparatus moves from a certain cell to another cell, the movement is allowed to another suitable cell with cell re-selection procedure at the time of non-radio connection (not under communication) or with handover procedure at the time of radio connection (under communication). The suitable cell is generally a cell which is judged, based on information specified from the base station apparatus, that access of the terminal apparatus is not prohibited, and indicates a cell in which reception quality of the downlink fulfills a predetermined condition.

The base station apparatus manages a cell which is an area in which the terminal apparatus may communicate with the base station apparatus for each frequency. One base station apparatus may manage a plurality of cells. A cell is classified into a plurality of types according to a size of an area (cell size) in which communication is allowed with the terminal apparatus. For example, a cell is classified into a macro cell and a small cell. The small cell is a cell which generally covers from several meters to several tens of meters of a radius. Further, the small cell is classified into a femto cell, a pico cell and a nano cell according to a size of an area thereof.

When the terminal apparatus is able to communicate with a certain base station apparatus, a cell which is configured so as to be used for communication with the terminal apparatus is a serving cell and other cell which is not used for the communication is referred to as a neighboring cell among cells of the base station apparatus.

[Primary Cell, Secondary Cell]

Moreover, a technique of aggregating frequencies (component carriers or frequency bands) of a plurality of different frequency bands and dealing with them as one frequency (frequency band) by carrier aggregation may be applied to the terminal apparatus and the base station apparatus. In the carrier aggregation, as the component carriers, there are an uplink component carrier coping with uplink and a downlink component carrier coping with downlink. In this specification, a frequency and a frequency band may be used synonymously.

For example, when five component carriers each having a frequency bandwidth of 20 MHz are aggregated by the carrier aggregation, a terminal apparatus having capability which allows the carrier aggregation performs transmission and reception by regarding the aggregated component carriers to have a frequency bandwidth of 100 MHz. Note that, the component carriers which are aggregated may be contiguous frequencies or frequencies the entire or a part of which are not contiguous. For example, when available frequency bands are an 800 MHz band, a 2 GHz band, and a 3.5 GHz band, a certain component carrier may be transmitted in the 800 MHz band, another component carrier may be transmitted in the 2 GHz band, and still another component carrier may be transmitted in the 3.5 GHz band.

It is also possible to aggregate a plurality of contiguous or non-contiguous component carriers in the same frequency band. The frequency bandwidth of each component carrier may be a frequency bandwidth (for example, 5 MHz or 10 MHz) narrower than a receivable frequency bandwidth (for example, 20 MHz) of the terminal apparatus, and respective frequency bandwidths for aggregation may be different from each other. It is desired that the frequency bandwidth be equal to any conventional frequency bandwidth of a cell by considering backward compatibility, but may have the frequency bandwidth different from the conventional frequency bandwidth of a cell.

Component carriers (carrier types) having no backward compatibility may be aggregated by carrier aggregation. The component carrier having no backward compatibility is also referred to as a new carrier type (NCT). Note that, the number of uplink component carriers allocated (configured, added) to the terminal apparatus by the base station apparatus is desired to be the same as or less than the number of downlink component carriers.

The terminal apparatus and the base station apparatus manage a cell that is constituted by a certain uplink component carrier and the downlink component carrier that is connected to this uplink component carrier in a cell-specific manner, as a primary cell (PCell). In addition, the terminal apparatus and the base station apparatus manage a cell that is constituted by a component carrier other than the primary cell as a secondary cell (SCell).

The terminal apparatus performs reception of a paging message, detection of broadcast information updating, initial access procedure, a configuration of security information and the like in the primary cell, but they may not be performed in the secondary cell. The primary cell and the secondary cell are collectively referred to as serving cells.

Although the primary cell is out of the target of control of activation and deactivation (that is, the primary cell is always regarded as being activated), the secondary cell has states of the cell as activation and deactivation. For changing the state of the cell for the secondary cell, the change of the state of the cell is explicitly designated (notified, instructed) from the base station apparatus, and additionally, the state of the cell is changed based on a timer (secondary cell deactivation timer) that the terminal apparatus counts the time on each component carrier (secondary cell).

Control for activation and/or deactivation of a secondary cell will be described. The base station apparatus notifies the terminal apparatus of a command indicating activation and/or deactivation of a secondary cell. This command is transmitted to the terminal apparatus as an MAC control element (MAC-CE) included in an MAC PDU (Protocol data unit) to be decoded in an MAC layer.

Figure 9:
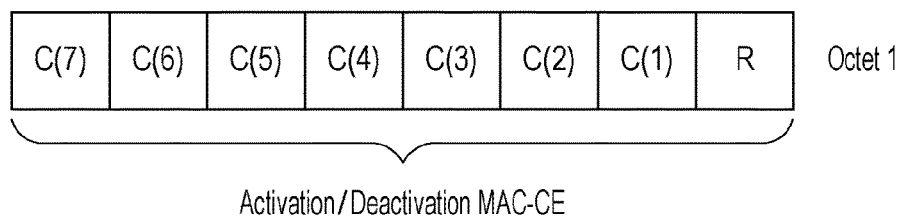
FIG. 9 is a view for explaining a format of control elements used for conventional control of a state of a cell.

The command indicating activation and/or deactivation of the secondary cell will be described in detail by using FIG. 9. The terminal apparatus receives, as the MAC control element indicating activation and/or deactivation (Activation/Deactivation MAC control element) of the secondary cell, a bit array of one octet (eight bits) notified with a format (bit structure (configuration)) of FIG. 9. A field of "R" in the figure is a reserve bit and has 0 (zero).

A field of "C(i)" (i=1 to 7) is bitmap information representing instruction information for changing the cell state of the secondary cell to activation and/or deactivation. i denotes an index number of a secondary cell and is notified to the terminal apparatus from the base station apparatus when a secondary cell is configured (allocated). When the field of "C(i)" is 1, the terminal apparatus brings the secondary cell corresponding to the index i into an activated state. On the other hand, when the field of "C(i)" is 0 (zero), the terminal apparatus brings the secondary cell corresponding to the index i into a deactivated state. When the secondary cell corresponding to the index i is not configured to the terminal apparatus, the terminal apparatus ignores the value of the index i.

In the field of C(i), when activation (that is, 1) is set to the activated secondary cell and when deactivation (that is, 0 (zero)) is set to the deactivated secondary cell, the terminal apparatus does not change the state of the corresponding cell (keeps the state of the cell).

Further, the terminal apparatus starts a secondary cell deactivation timer upon the activated secondary cell to count the time. That is, the secondary cell deactivation timer is counted for each activated secondary cell. When the secondary cell deactivation timer expires, the terminal apparatus deactivates the cell state of the corresponding secondary cell. To the secondary cell deactivation timer, an initial value which is common in all secondary cells configured to the terminal apparatus is applied. When uplink grant or downlink assignment is notified by the PDCCH, the secondary cell deactivation timer is restarted in the secondary cell which has received the PDCCH, the secondary cell to which a radio resource is allocated by the PDCCH, or both of these secondary cells.

The terminal apparatus initiates transmission of SRS and reporting of CSI in the activated secondary cell. Further, the terminal apparatus initiates monitoring of PDCCH of the activated secondary cell and monitoring of PDCCH of a cell which is used for scheduling of the activated secondary cell. On the other hand, in the deactivated secondary cell, the terminal apparatus stops transmission of SRS, reporting of CSI, transmission of uplink data, initiating of random access procedure, monitoring of PDCCH of the corresponding secondary cell, and monitoring of PDCCH of a cell which is used for scheduling of the corresponding secondary cell.

Note that, the carrier aggregation is communication with a use of a plurality of cells by using a plurality of component carriers (frequency bands), and is also referred to as cell aggregation. Note that, the terminal apparatus may be radio-connected to the base station apparatus through a relay station apparatus (or repeater) for each frequency. That is, the base station apparatus of the each embodiment of the invention may be substituted with a relay station apparatus.

[Dual Connectivity]

Figure 10:
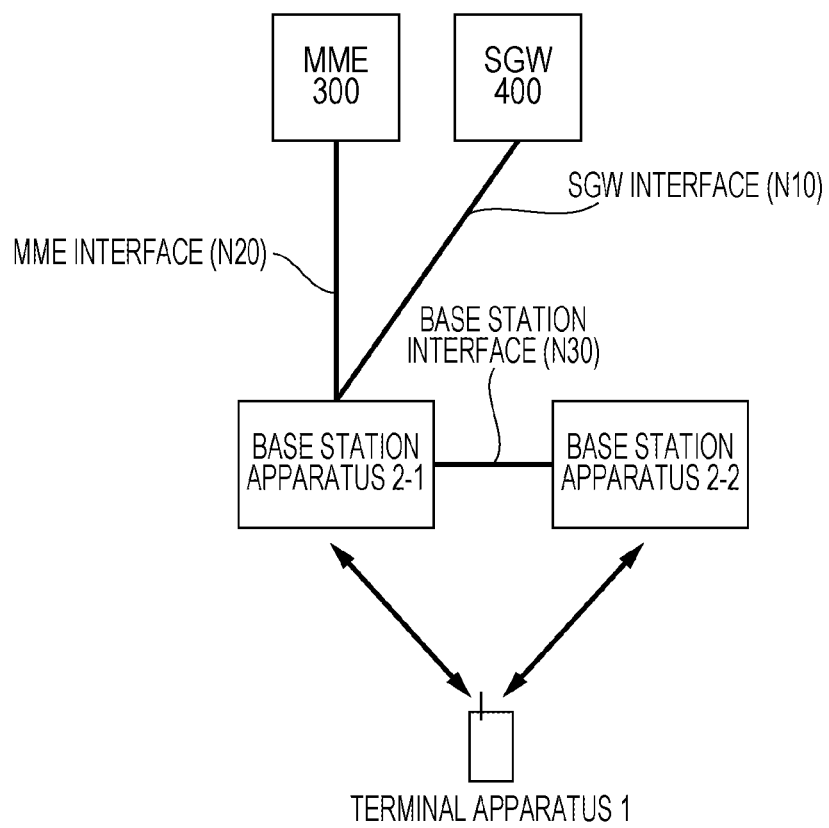
FIG. 10 is a view illustrating one example of architecture of dual connectivity according to an embodiment of the invention.
Figure 11:
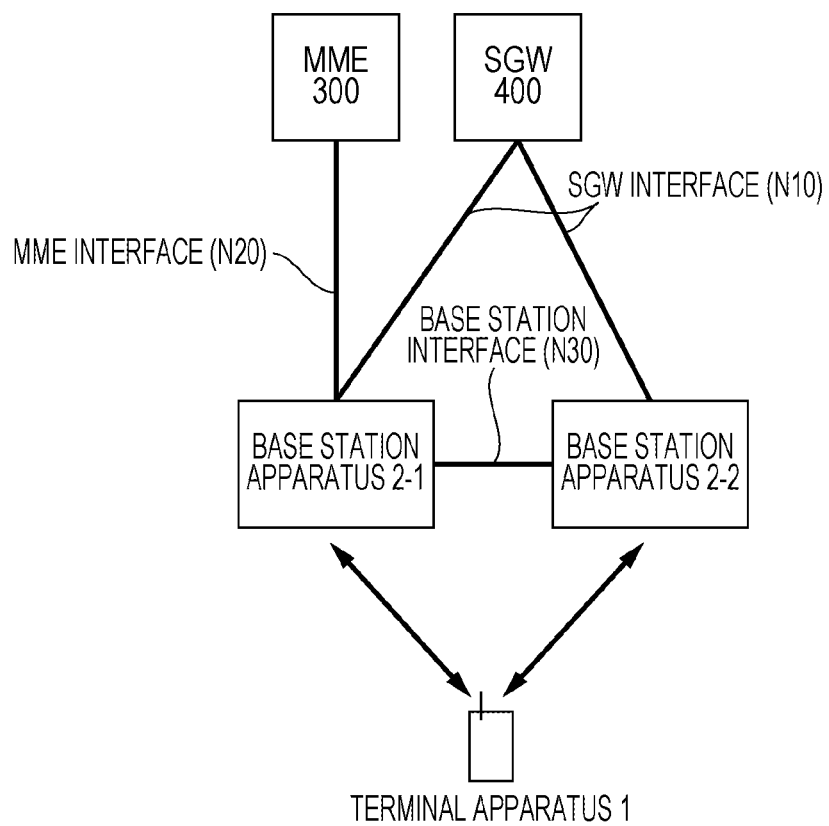
FIG. 11 is a view illustrating another example of architecture of dual connectivity according to an embodiment of the invention.

Referring to FIG. 10 and FIG. 11, a basic structure (architecture) of the dual connectivity will be described. FIG. 10 and FIG. 11 illustrate that a terminal apparatus 1 is connected to a plurality of base station apparatuses 2 (which are indicted as a base station apparatus 2-1 and a base station apparatus 2-2 in the figures) simultaneously. It is considered that the base station apparatus 2-1 is a base station apparatus which constitutes a macro cell and the base station apparatus 2-2 is a base station apparatus which constitutes a small cell. Such simultaneous connection of the terminal apparatus 1 by using a plurality of cells belonging to the base station apparatuses 2 is referred to as dual connectivity. The respective base station apparatuses 2 may be operated at the same frequency or may be operated at different frequencies.

Note that, the carrier aggregation is different from connection by the dual connectivity in that a plurality of cells are managed by one base station apparatus 2 and frequencies of the cells are different from each other, and that a backbone line speed of which is so high that influence of a delay does not need to be considered is used between the plurality of cells. In other words, the carrier aggregation is a technique for connecting one terminal apparatus 1 and one base station apparatus 2 through a plurality of cells, while the dual connectivity is a technique for connecting one terminal apparatus 1 and a plurality of base station apparatuses 2 through a plurality of cells.

In the terminal apparatus 1 and the base station apparatuses 2, the technique applied to the carrier aggregation may be applied to the dual connectivity. For example, the terminal apparatus 1 and the base station apparatuses 2 may apply techniques of management (addition, deletion, modification or the like) of the primary cell and the secondary cell, a measurement method and a measurement event configuration, which correspond to the carrier aggregation, activation/deactivation of the state of the cell, and the like, to cells connected by the dual connectivity.

In FIG. 10 and FIG. 11, the base station apparatus 2-1 or the base station apparatus 2-2 is connected to an MME 300 and an SGW 400 thorough a backbone line. The MME 300 is a control station apparatus higher than the base station apparatus 2 corresponding to MME (Mobility Management Entity), and has a function of mobility management and authentication control (security control) for the terminal apparatus 1, configuring a path of user data with respect to the base station apparatuses 2, etc. The SGW 400 is a higher control station apparatus corresponding to Serving Gateway (S-GW), and has a function of transmission of the user data in accordance with the path of the user data to the terminal apparatus 1, which is configured by the MME 300, etc.

A connection path between the base station apparatus 2-1 or the base station apparatus 2-2 and the SGW 400 is referred to as an SGW interface N10 in FIG. 10 and FIG. 11. Further, a connection path between the base station apparatus 2-1 or the base station apparatus 2-2 and the MME 300 is referred to as an MME interface N20. Further, a connection path between the base station apparatus 2-1 and the base station apparatus 2-2 is referred to as a base station interface N30. The SGW interface N10 is also referred to as an S1-U interface in the EUTRA. Further, the MME interface N20 is also referred to as an S1-MME interface in the EUTRA. Furthermore, the base station interface N30 is also referred to as an X2 interface in the EUTRA.

The architecture realizing the dual connectivity may have the configuration of the network like in FIG. 10. In FIG. 10, the base station apparatus 2-1 and the MME 300 are connected by the MME interface N20. Moreover, the base station apparatus 2-1 and the SGW 400 are connected by the SGW interface N10. The base station apparatus 2-1 provides the base station apparatus 2-2 with communication paths with the MME 300 and/or the SGW 400 through the base station interface N30. In other words, the base station apparatus 2-2 is connected to the MME 300 and/or the SGW 400 via the base station apparatus 2-1.

Another architecture realizing the dual connectivity may have a configuration of the network like in FIG. 11. In FIG. 11, the base station apparatus 2-1 and the MME 300 are connected by the MME interface N20. Moreover, the base station apparatus 2-1 and the SGW 400 are connected by the SGW interface N10. The base station apparatus 2-1 provides the base station apparatus 2-2 with a communication path with the MME 300 through the base station interface N30. In other words, the base station apparatus 2-2 is connected to the MME 300 via the base station apparatus 2-1. Moreover, the base station apparatus 2-2 is connected to the SGW 400 through the SGW interface N10.

Note that, it may be configured such that the base station apparatus 2-2 and the MME 300 are connected directly by the MME interface N20.

Description will hereinafter be given in detail for appropriate embodiments of the invention with reference to accompanying drawings while considering above matters. Note that, in the description of the embodiments of the invention, when it is judged that specific description of known functions or configurations involved in the embodiments of the invention makes the subject matter of the embodiments of the invention unclear, the detailed description thereof will be omitted.

[First Embodiment]

A first embodiment of the invention will be described below.

FIG. 1 is a block diagram illustrating one example of a terminal apparatus 1 according to the first embodiment of the invention. This terminal apparatus 1 is compose of a reception unit 101, a demodulation unit 102, a decoding unit 103, a measurement processing unit 104, a control unit 105, an uplink buffer control unit 106, a coding unit 107, a modulation unit 108, a transmission unit 109, an uplink radio resource request control unit 110, a random access control unit 111, and a higher layer unit 112. The higher layer unit 112 is a block realizing a specific function of an RRC (Radio Resource Control) layer which carries out radio resource control as a higher layer of the terminal apparatus 1.

The uplink buffer control unit 106, the uplink radio resource request control unit 110, and the random access control unit 111 are blocks realizing a specific function of an MAC (Medium Access Control) layer which manages a data link layer. The specific function of the MAC layer is realized also in the higher layer unit 112. The "unit" in the figure is an element which realizes functions and each procedure of the terminal apparatus 1, which is represented also as a term of a section, a circuit, a configuration apparatus, an apparatus, a unit and the like.

Note that, the terminal apparatus 1 may have a configuration including a plurality of reception-based blocks (the reception unit 101, the demodulation unit 102 and the decoding unit 103) for supporting simultaneous reception of a plurality of frequencies (frequency bands, frequency bandwidths) or cells and a plurality of transmission-based blocks (the coding unit 107, the modulation unit 108 and the transmission unit 109) for supporting simultaneous transmission of a plurality of frequencies (frequency bands, frequency bandwidths) or cells by the carrier aggregation and/or the dual connectivity. Further, the terminal apparatus 1 may have a configuration of including a plurality of measurement processing units 104, a plurality of control units 105, a plurality of uplink buffer control units 106, a plurality of uplink radio resource request control units 110, a plurality of random access control units 111, and a plurality of higher layer units 112.

Regarding reception, terminal apparatus control information is input from the higher layer unit 112 to the control unit 105. The terminal apparatus control information is information which is necessary for radio communication control of the terminal apparatus 1 and which is configured by reception control information and transmission control information, and is configured by radio resource control information, cell-specific broadcast information or a system parameter, which is transmitted individually from the base station apparatus 2, and input to the control unit 105 as necessary by the higher layer unit 112. The control unit 105 appropriately inputs the reception control information which is control information about reception to the reception unit 101, the demodulation unit 102 and the decoding unit 103.

The reception control information includes information such as DRX control information, a reception timing related to each channel, a multiplexing method, and radio resource arrangement information in addition to information of a reception frequency band. Further, the control unit 105 inputs measurement configuration information which becomes necessary for control related to measurement of a cell to the measurement processing unit 104. The measurement configuration information is information which includes measurement event information for measurement event decision as to whether measurement results for a serving cell and a neighboring cell measured by the terminal apparatus 1 have fulfilled a specified measurement event. Further, the measurement configuration information is information which includes neighboring cell information for deciding whether or not a measurement result for a neighboring cell measured by the terminal apparatus 1 fulfills a selection reference related to cell selection.

A reception signal is received at the reception unit 101. The reception unit 101 receives a signal with a frequency band specified by the reception control information. The received signal is input to the demodulation unit 102. The demodulation unit 102 performs demodulation of the received signal and inputs the signal to the decoding unit 103 to decode downlink data and downlink control data correctly. Here, an MAC control element which is transmitted from the base station apparatus 2 with each data (the downlink data or the downlink control data) is decoded at the decoding unit 103. Each decoded data is input to the higher layer unit 112, and data related to measurement is input to the measurement processing unit 104.

Moreover, the measurement processing unit 104 measures reception quality of a downlink reference signal (SIR, SINR, RSRP, RSRQ, RSSI, path-loss or the like) of a detected neighboring cell (component carrier) to generate a necessary measurement result. The RSRP is a value indicating a magnitude of receive power of the downlink reference signal, and the RSRQ is a value indicating quality of the downlink reference signal.

The measurement processing unit 104 uses the measurement result as cell quality information for deciding whether or not a measurement event based on the measurement event information which is configured is successful. Moreover, the measurement processing unit 104 uses the measurement result as quality information for a selection reference for cell selection or cell reselection based on the neighboring cell information which is configured. Note that, the signal used for measurement is not limited to the downlink reference signal, and other signal may be measured as long as being a signal used for measuring quality of a cell, such as a CSI-RS.

In addition, regarding transmission, from the higher layer unit 112 to the control unit 105, the terminal apparatus control information which is a control parameter for controlling each block is input, and the transmission control information which is control information related to transmission is appropriately input to the uplink buffer control unit 106, the coding unit 107, the modulation unit 108 and the transmission unit 109. The transmission control information includes information such as DTX control information, coding information, modulation information, information of a transmission frequency band, a transmission timing related to each channel, a multiplexing method and radio resource arrangement information as uplink scheduling information of a transmitted signal.

Random access configuration information is input from the higher layer unit 112 to the random access control unit 111. The higher layer unit 112 may configure plural pieces of random access configuration information respectively corresponding to a plurality of cells to the random access control unit 111. Further, the higher layer unit 112 manages transmission timing adjustment information and a transmission timing timer which are used for adjustment of an uplink transmission timing, and manages a state of the uplink transmission timing (transmission timing adjustment state or transmission timing non-adjustment state) for each cell (or for each cell group or for each TA group). The transmission timing adjustment information and the transmission timing timer are included in the transmission control information.

Note that, when it is necessary to manage the state of a plurality of uplink transmission timings, the higher layer unit 112 manages transmission timing adjustment information corresponding to an uplink transmission timing of each of the plurality of cells (or a cell group and a TA group).

Invoked transmission data (uplink data and uplink control data) is input from the higher layer unit 112 to the uplink buffer control unit 106 at any timing. At this time, the uplink buffer control unit 106 calculates a quantity of the input transmission data (uplink buffering quantity). Moreover, the uplink buffer control unit 106 has a function of discriminating whether the input transmission data is data belonging to a control-plane or data belonging to a user-plane.

Resource request configuration information is configured to the uplink radio resource request control unit 110 by the higher layer unit 112. Note that, the resource request configuration information is a part of uplink control channel configuration information. The resource request configuration information includes at least maximum transmission counter configuration information and radio resource request prohibit timer information. The higher layer unit 112 may configure plural pieces of resource request configuration information respectively corresponding to a plurality of cells to the uplink radio resource request control unit 110. Further, the uplink buffer control unit 106, when transmission data is input to the uplink buffer control unit 106, notifies the uplink radio resource request control unit 110 of occurrence of the transmission data to thereby inform that the transmission data exists in an uplink buffer.

The uplink radio resource request control unit 110 judges whether a radio resource needed for transmission of the input transmission data is allocated. Based on the allocation of the radio resource, the uplink radio resource request control unit 110 selects any one of a physical uplink shared channel PUSCH, a radio resource request by a physical uplink control channel (SR-PUCCH) and a physical random access channel, and requests, to the coding unit 107 and/or the random access control unit 111, control processing for transmitting the selected channel.

That is, when the radio resource has been already allocated and a state in which the transmission data may be transmitted by the physical uplink shared channel PUSCH has come, the coding unit 107 acquires, in accordance with an instruction of uplink radio resource request control unit 110, the transmission data corresponding to the radio resource which has been allocated from the uplink buffer control unit 106 for coding, followed by outputting to the modulation unit 108. Alternatively, when the radio resource has not been allocated and a radio resource request by the physical uplink control channel (SR-PUCCH) is allowed, the coding unit 107 codes control data needed for transmission of the SR-PUCCH in accordance with an instruction of the uplink radio resource request control unit 110 to output to the modulation unit 108.

Alternatively, when the radio resource has not been allocated and the radio resource request by the physical uplink control channel (SR-PUCCH) is not allowed, the coding unit 107 instructs the random access control unit 111 to initiate random access procedure. At this time, the coding unit 107 generates a preamble sequence, which is transmitted by the physical random access channel, based on random access configuration information input from the random access control unit 111. Moreover, the coding unit 107 appropriately codes each data in accordance with the transmission control information to output to the modulation unit 108.

The modulation unit 108 performs modulation processing appropriately based on a channel structure for transmitting an output from the coding unit 107. The transmission unit 109 performs mapping of an output of the modulation unit 108 to a frequency domain and converts a signal of the frequency domain into a signal of a time domain and carries it on a carrier wave of a given frequency to perform power amplification. The transmission unit 109 further adjusts an uplink transmission timing in accordance with the transmission timing adjustment information for each cell (or for each cell group or for each TA group) input from the higher layer unit 112. The physical uplink shared channel in which uplink control data is arranged may include, for example, a layer 3 message (radio resource control message; RRC message) in addition to user data.

In FIG. 1, though other components of the terminal apparatus 1 are omitted, it is apparent that a plurality of blocks having other functions necessary for operation as the terminal apparatus 1 are included as components.

Figure 2:
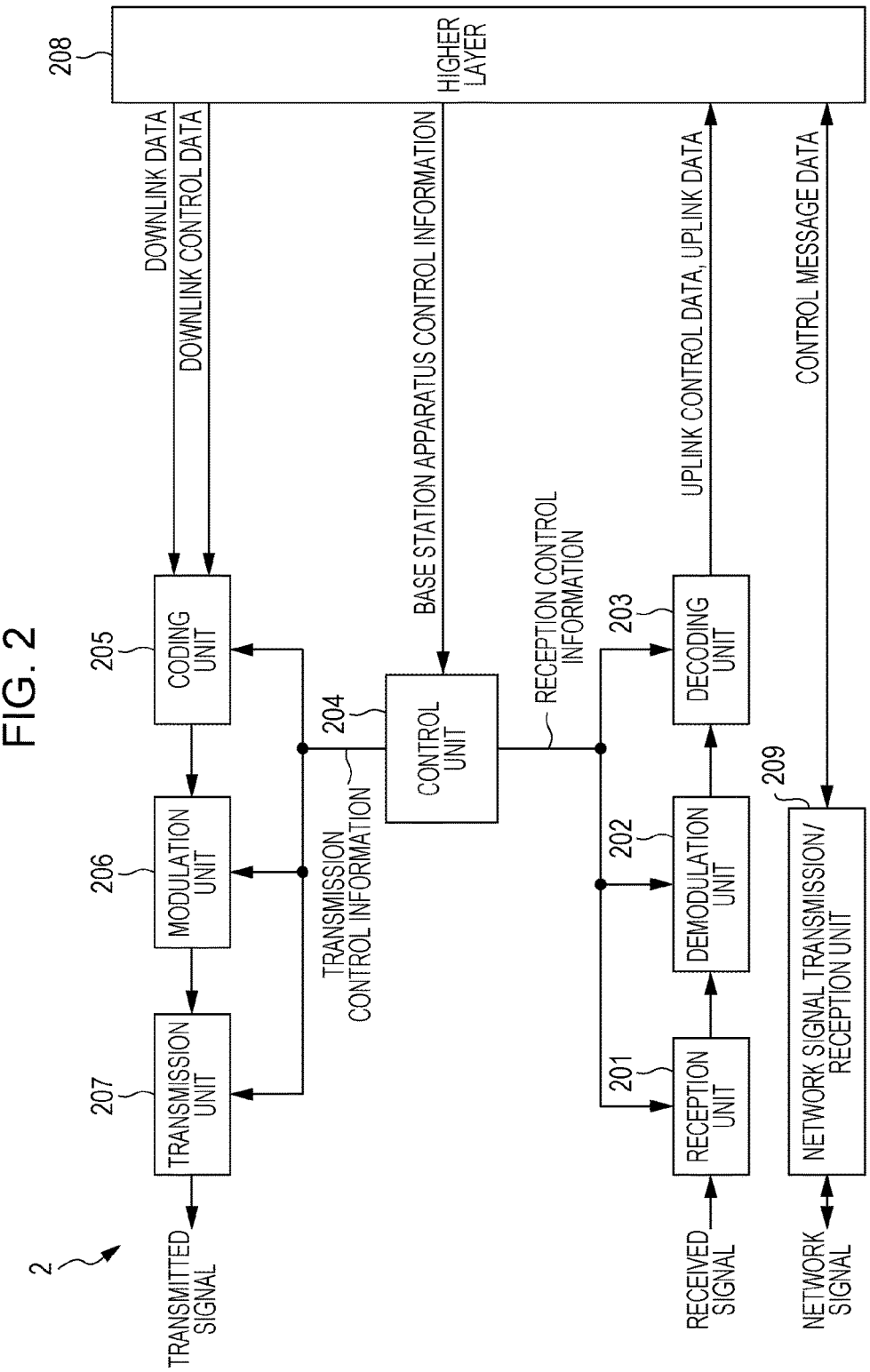
FIG. 2 is a block diagram illustrating one example of a schematic configuration of a base station apparatus according to the embodiment of the invention.

FIG. 2 is a block diagram illustrating one example of the base station apparatus 2 according to the first embodiment of the invention. The present base station apparatus is composed of a reception unit 201, a demodulation unit 202, a decoding unit 203, a control unit 204, a coding unit 205, a modulation unit 206, a transmission unit 207, a higher layer unit 208, and a network signal transmission/reception unit 209. The "unit" in the figure is an element which realizes functions and each procedure of the base station apparatus 2, which is represented also as a term of a section, a circuit, a configuration apparatus, a apparatus, a unit and the like.

Note that, the base station apparatus 2 may have a configuration including a plurality of reception-based blocks (the reception unit 201, the demodulation unit 202 and the decoding unit 203) and a plurality of transmission-based blocks (the coding unit 205, the modulation unit 206 and the transmission unit 207) for supporting a plurality of frequencies (frequency bands, frequency bandwidths) by the carrier aggregation and/or the dual connectivity. Further, it may be configured to include a plurality of control units 204, a plurality of higher layer units 208, and a plurality of network signal transmission/reception units 209.

The higher layer unit 208 is a block realizing a specific function of an RRC (Radio Resource Control) layer which carries out radio resource control as a higher layer of the base station apparatus 2.

The higher layer unit 208 inputs downlink data and downlink control data to the coding unit 205. The coding unit 205 codes the input data and inputs the resultant to the modulation unit 206. The modulation unit 206 performs modulation of a coded signal. Here, when there is an MAC control element to be transmitted to the terminal apparatus 1, it is coded with each data (downlink data or downlink control data) at the coding unit 205. Further, the signal output from the modulation unit 206 is input to the transmission unit 207. After mapping the input signal into a frequency domain, the transmission unit 207 converts the signal of the frequency domain into a signal of a time domain for transmission by carrying on a carrier wave of a given frequency to perform power amplification. A physical downlink shared channel in which the downlink control data is arranged typically configures a layer 3 message (RRC message).

The reception unit 201 converts a signal received from the terminal apparatus 1 into a base-band digital signal. When cells of a plurality of different transmission timings are configured to the terminal apparatus 1, the reception unit 201 receives a signal at different timings for each cell (or for each cell group or for each TA group). The digital signal converted at the reception unit 201 is input to the demodulation unit 202 and demodulated. The signal demodulated at the demodulation unit 202 is subsequently input to the decoding unit 203 and decoded, and uplink control data and uplink data which are decoded correctly are output to the higher layer unit 208.

Base station apparatus control information needed for control of each of the blocks is information needed for radio communication control of the base station apparatus 2, which is composed of reception control information and transmission control information, and is configured by a higher network apparatus (MME (MME 300), gateway apparatus (SGW 400), OAM or the like) or a system parameter, to be input to the control unit 204 as necessary by the higher layer unit 208.

The control unit 204 appropriately inputs the base station apparatus control information involved in transmission as the transmission control information to each of the blocks of the coding unit 205, the modulation unit 206 and the transmission unit 207, and the base station apparatus control information involved in reception as the reception control information to each of the blocks of the reception unit 201, the demodulation unit 202 and the decoding unit 203. RRC exists as a part of the higher layer unit 208.

On the other hand, the network signal transmission/reception unit 209 performs transmission (transfer) or reception of a control message or user data between the base station apparatuses 2 or between a higher network apparatus (the MME 300 or the SGW 400) and the base station apparatus 2. In FIG. 2, though other components of the base station apparatus 2 are omitted, it is apparent that a plurality of blocks having other functions necessary for operation as the base station apparatus 2 are included as components.

Figure 3:
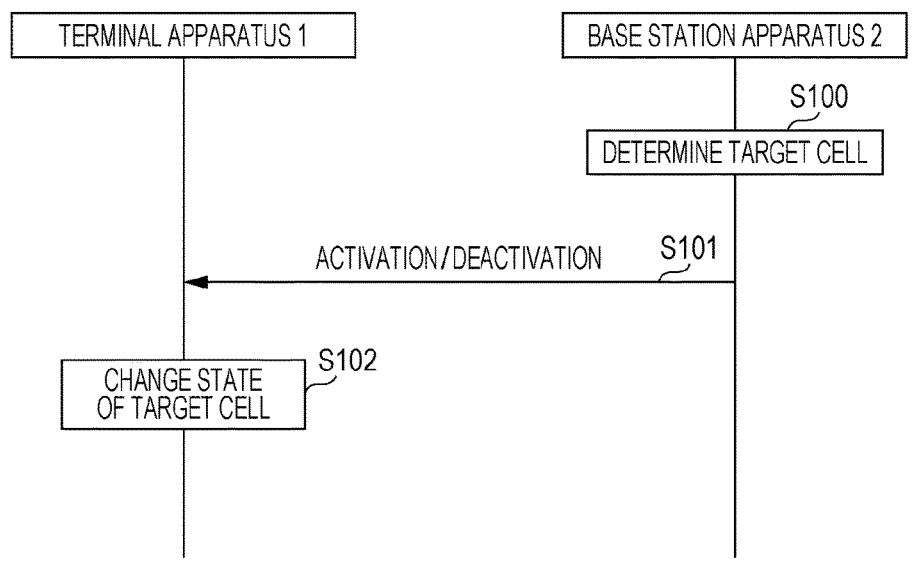
FIG. 3 is a sequence chart illustrating procedure of controlling a state of a cell according to the embodiment of the invention.

FIG. 3 illustrates one example of a sequence chart related to procedure of controlling a cell state of activation and/or deactivation of a secondary cell in the first embodiment of the invention.

In FIG. 3, the terminal apparatus 1 is in a state of being connected to the base station apparatus 2 by using a plurality of cells. Further, the base station apparatus 2 includes the base station apparatus 2-1 and the base station apparatus 2-2.

First, the base station apparatus 2 determines a cell (secondary cell), which is a target of control for activation and/or deactivation, at step S100. The base station apparatus 2 may determine the cell to be the target of control for a state of a cell based on one of information of, for example, (1) a buffer status of uplink reported by a buffer status report of the terminal apparatus 1, (2) a measurement event report or a CSI report, which is established in the secondary cell, (3) load condition of the cell, and (4) a mobility speed of the terminal apparatus 1, or a combination thereof. The base station apparatus 2 may determine the cell to be a target of activation and/or deactivation by using other information.

The base station apparatus 2 then configures information for instructing activation and/or deactivation of the cell, which is determined as the target of the control at step S100, based on a format of an MAC control element described below, generates an MAC PDU with the MAC control element included, performs coding and modulation processing, and performs mapping into the PDSCH to transmit the resultant to the terminal apparatus 1 (step S101). Note that, though the transmission of the PDSCH which includes the MAC control element indicating activation and/or deactivation at step S101 involves transmission of a PDCCH or an EPDCCH indicating downlink grant, procedure thereof will be omitted in the figure.

The terminal apparatus 1 receives the MAC control element for instructing activation/deactivation, which is transmitted at step S101, and changes the cell state of the secondary cell configured (allocated) to the terminal apparatus 1 based on the MAC control element (step S102). The changing in the cell state of the secondary cell includes changing from activation to deactivation and/or changing from deactivation to activation. With the MAC control element, it is also possible to instruct changes of a plurality of cell states at one time. Note that, though ACK/NACK is transmitted from the terminal apparatus 1 to the base station apparatus 2 with the reception of the PDSCH at step S101, procedure thereof will be omitted in the figure.

Figure 4:
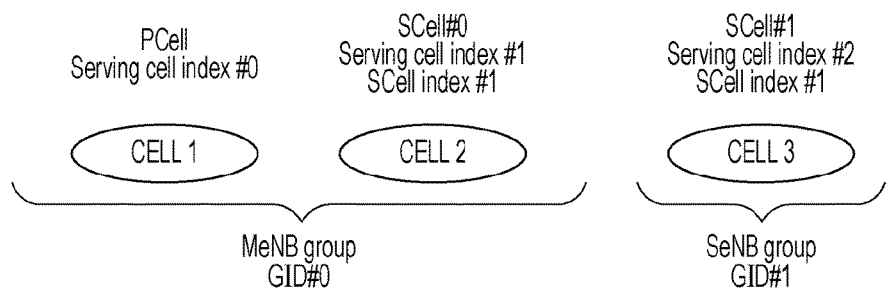
FIG. 4 is a view illustrating one example of allocation of cells and cell indexes according to a first embodiment of the invention.
Figure 5:
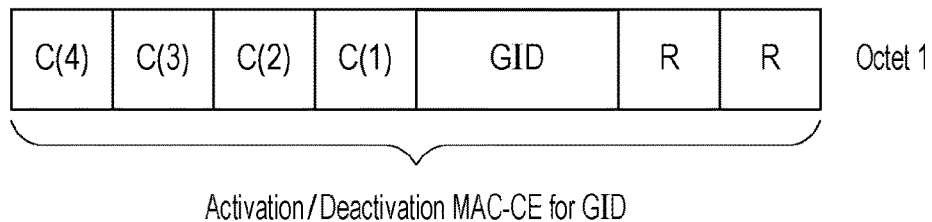
FIG. 5 is a view illustrating one example of a format of control elements used for controlling a state of a cell according to the first embodiment of the invention.
Figure 6:
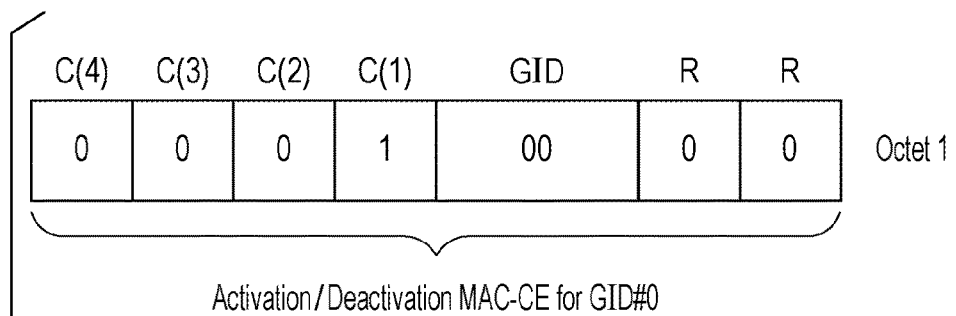
FIG. 6 is a view illustrating one example of bit allocation in control elements used for controlling a state of a cell according to the first embodiment of the invention.
Figure 6:
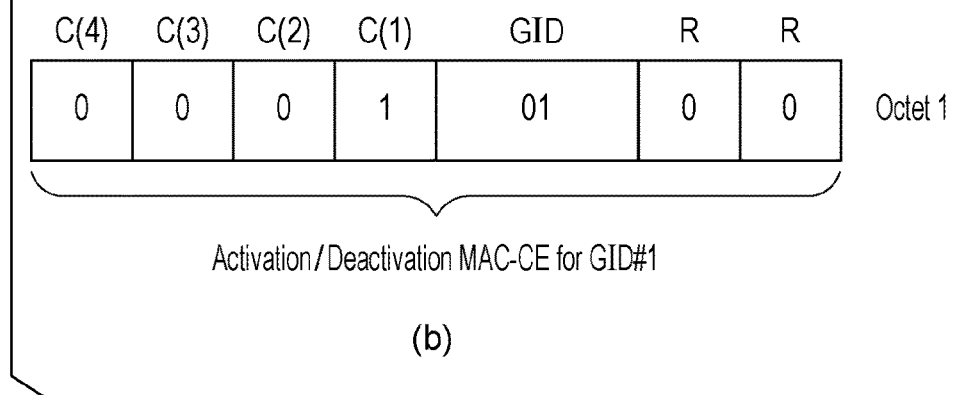

Referring to FIG. 4 to FIG. 6, procedure of controlling activation and deactivation of the secondary cell related to the first embodiment of the invention will be described.

In the first embodiment, an index number specifying a secondary cell is configured independently for each cell group. An MAC control element indicating activation/deactivation of a secondary cell is transmitted with a number of a target cell group included. Thus, description will be given for a method that an MAC control element indicating activation/deactivation of a secondary cell is newly prepared for each group to separately use a first MAC control element (FIG. 9) which is used when the dual connectivity is not performed and a second MAC control element (FIG. 5) which is used when the dual connectivity is performed.

FIG. 4 is a view for explaining one example of allocation of cells and cell indexes according to the first embodiment of the invention. To the terminal apparatus 1, a cell 1, a cell 2, and a cell 3 are configured by the base station apparatus 2 for connection by the dual connectivity. Here, the cell 1 is a primary cell (PCell), the cell 2 is a secondary cell #0 (SCell #0), and the cell 3 is a secondary cell #1 (SCell #1).

Moreover, for example, as to a serving cell index indicating an index number of a serving cell, the cell 1 has a serving cell index #0, the cell 2 has a serving cell index #1 and the cell 3 has a serving cell index #2, and as to a secondary cell index (SCell index) indicating an index number of a secondary cell, the cell 2 has a secondary cell index #1 (SCell index #1) and the cell 3 has a secondary cell index #1 (SCell index #1).

The cell 1 and the cell 2 are cells managed by the base station apparatus 2-1 in FIG. 10 or FIG. 11 and are typically macro cells. On the other hand, the cell 3 is a cell managed by the base station apparatus 2-2 in FIG. 10 or FIG. 11 and is typically a small cell. The cell 1 and the cell 2 belong to a first cell group (master cell group, MeNB Group) used by the terminal apparatus 1 for connection to the base station apparatus 2-1, and has a group ID (Group ID: GID) of, for example, GID #0. The cell 3 belongs to a second cell group (secondary cell group, SeNB Group) used by the terminal apparatus 1 for connection to the base station apparatus 2-2, and has a group ID of, for example, GID #1. The group ID may be also referred to as a group identifier (group identification information).

The cell group to which each cell belongs may be designated individually by an RRC message. In this case, the cell group is identified according to an identifier (GID) included in the RRC message. Moreover, the cell group to which each cell belongs may be the same as a TA group. In this case, the cell group is identified (classified) according to an identifier (TAG ID) designating a TA group. Note that, cells for which the indicators are not designated may form one group. For example, a cell group to which cells for which the indicators are not designated belongs may be a master cell group which includes a primary cell.

Note that, the master cell group is also referred to as a macro cell group or an anchor cell group. The secondary cell group is also referred to as a small cell group, a slave cell group, or an assisting cell group. Note that, even with a name other than the master cell group and the secondary cell group, there is no difference in a method for controlling the state of the cell for the respective cell groups. Though one or more cells may be merely exist in a group, the base station apparatus 2 is not allowed to perform a configuration by which a total number of the cells belonging to each group or the maximum number of the groups themselves exceed capability of the terminal apparatus 1.

In FIG. 4, since the cell 2 and the cell 3 have the same secondary cell index number (SCell index #1), with a conventional MAC control element indicating activation/deactivation, it is not clear which cell is to be controlled. Thus, the secondary cell to be controlled is determined uniquely by adding information of group IDs as illustrated in FIG. 5.

FIG. 5 is a view for explaining one example of a format of control elements used for controlling a state of a cell according to the first embodiment. As a five-bit ID (LCID) for identifying that the MAC control element is formed with the format of FIG. 5, a new bit sequence is allocated (for example, "11010"). The LCID is included in an MAC header. A meaning of a bit (bit map information) designated by a field "R" and a field "C(i)" (i=1 to 4) in the figure is the same as that of FIG. 9, so that detailed description thereof will be omitted. However, a bit length of the field of "C(i)" is not a seven bit length but is shortened to a four bit length.

A field "GID" of FIG. 5 is used for designating a cell group, to which a secondary cell as a target of activation/deactivation belongs, with a group ID. For example, when two bits are used as the field "GID", "00" and "01" indicate GID #0 and GID #1, respectively. The bit number allocated to the field "GID" is not limited to two bits, and may be, for example, one bit. When the field "GID" is one bit, the field "C(i)" may have a five bit length.

Note that, a number allocated to a cell configuration other than FIG. 4, that is, the serving cell index, the secondary cell index, and the group ID is not limited to the example of FIG. 4. However, either the serving cell index or the secondary cell index needs to have a number which is unique for each cell to the terminal apparatus 1. Though FIG. 4 illustrates the example in which the serving cell index has a unique number, when the secondary cell index has a unique number, i of the field C(i) of FIG. 5 is to indicate the serving cell index.

FIG. 6 is a view for explaining one example of configured bits when activation/deactivation is controlled for allocation of the secondary cells (cell configuration) illustrated in FIG. 4.

FIG. 6(*a*) illustrates an example of a configured bit when the cell 2 belonging to the master cell group is activated. Specifically, the base station apparatus 2 sets "00" which indicates the group ID (GID #0) of the master cell group to a field of GID. Further, the base station apparatus 2 sets "1" indicating activation to a field of C(1) corresponding to the secondary cell index (SCell index #1) of the cell 2. Since there is no other secondary cell in GID #0, the base station apparatus 2 respectively sets C(4)=0, C(3)=0, and C(2)=0.

FIG. 6(*b*) illustrates an example of a configured bit when the cell 3 belonging to the secondary cell group is activated. Specifically, the base station apparatus 2 sets "01" indicating the group ID (GID #1) of the secondary cell group to the field of GID. Further, the base station apparatus 2 sets "1" indicating activation to the field of C(1) corresponding to the secondary cell index (SCell index #1) of the cell 3. Since there is no other secondary cell in GID #1, the base station apparatus 2 respectively sets C(4)=0, C(3)=0, and C(2)=0.

By configuring the bit in this manner, the terminal apparatus 1 is able to judge (decide, determine) which cell group is a target of a command (MAC information element) indicating activation and/or deactivation of a received secondary cell, based on the field of GID. It is possible to judge which cell among cells belonging to the designated cell group is to be activated and/or deactivated, based on the field of C(i).

Note that, in FIG. 6(*a*), when the cell 2 belonging to the master cell group is deactivated, the base station apparatus 2 sets "00" indicating the group ID (GID #0) of the master cell group to the field of GID, sets "0" indicating deactivation to the field of C(1) corresponding to the secondary cell index (SCell index #1) of the cell 2, and respectively sets C(4)=0, C(3)=0, and C(2)=0.

Such a configuration allows the terminal apparatus 1 and the base station apparatus 2 to solve a problem of inconsistency of the state, which is caused by that information of the state (activation, deactivation) of a secondary cell is not transferred (exchanged) between the base station apparatus 2-1 and the base station apparatus 2-2, in particular, a problem that a secondary cell which is not used, that is, a secondary cell which is deactivated is activated and a secondary cell which is used, that is, a secondary cell which is activated is deactivated.

Even when the state of the secondary cell is changed, it becomes unnecessary to exchange (transmit/receive) information about the state of the secondary cell between the base station apparatus 2-1 and the base station apparatus 2-2. It is possible to distribute secondary cell indexes which are overlapped between the base station apparatus 2-1 and the base station apparatus 2-2, so that each of the base station apparatus 2-1 and the base station apparatus 2-2 is able to perform an independent cell configuration, thus flexibility of scheduling is enhanced.

The terminal apparatus 1 of the present embodiment becomes possible to perform control for the state of the cell independently, which does not affect states of cells of other groups, based on the group ID and the cell index which are notified with the received MAC control element. Further, the base station apparatus 2 of the present embodiment becomes possible to notify the terminal apparatus 1 of information which allows control for the state of the cell without affecting states of cells of other groups, which is adaptive to a method for connecting the terminal apparatus 1 to a plurality of cells, by using an MAC control element. That is, the base station apparatus 2 becomes possible to cause the terminal apparatus 1 to carry out procedure of efficiently controlling the state of the cell in a network in which a delay is caused in a backbone line between the base station apparatuses 2.

According to the first embodiment, the terminal apparatus 1 is able to have means for appropriately controlling states of activation and deactivation of a cell based on a group ID and a cell index which are notified from the base station apparatus 2 with a command for instructing activation and/or deactivation of a secondary cell, so that the procedure of controlling the state of the cell becomes efficient. Further, the base station apparatus 2 is able to have means for providing procedure of controlling the state of the cell without inconsistency of the state between the base station apparatus 2 and the terminal apparatus 1 by notifying the terminal apparatus 1 of a group ID and a cell index with a command for instructing activation and/or deactivation of a secondary cell, thus making it possible to prevent reduction in throughput by performing efficient scheduling for the terminal apparatus 1.

[Second Embodiment]

A second embodiment of the invention will be described below.

Indicated in the second embodiment is a method for controlling the state of the cell, in which a conventional MAC control element used for activation and/or deactivation of a secondary cell is able to be reused by judging (deciding, determining) a secondary cell as a target of activation and/or deactivation based on a group to which a cell, which has received the MAC control element, by the terminal apparatus 1.

Configurations of the terminal apparatus 1 and the base station apparatus 2 of the second embodiment may be the same as configurations of the first embodiment, so that the description thereof will be omitted. However, the terminal apparatus 1 and the base station apparatus 2 of the second embodiment have capability of realizing the procedure of controlling the state of the cell, by which a cell as a target of activation and/or deactivation and a cell which transmits/receives an MAC control element are controlled to be associated with each other. Note that, a sequence chart associated with the second embodiment of the invention may be the same as one illustrated in FIG. 3.

Figure 7:
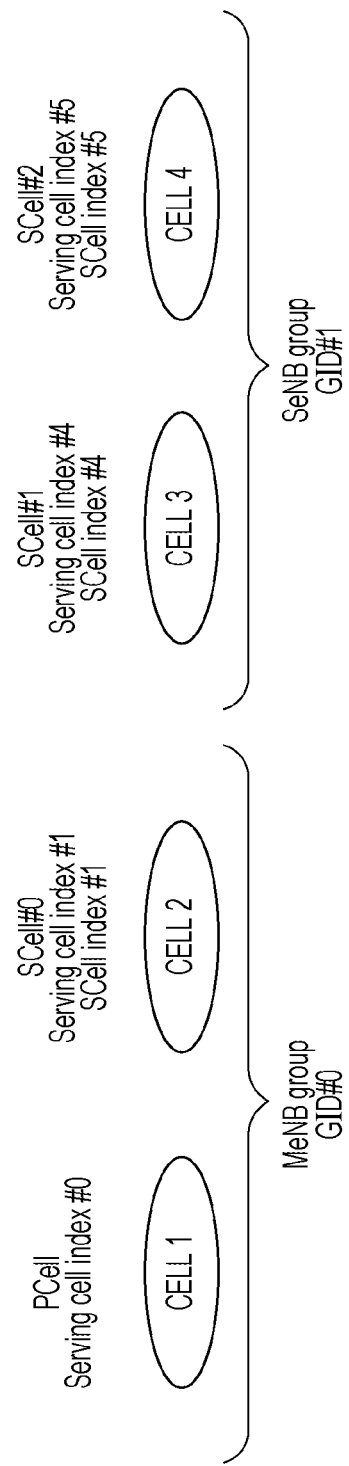
FIG. 7 is a view illustrating one example of allocation of cells and cell indexes according to a second embodiment of the invention.
Figure 8:
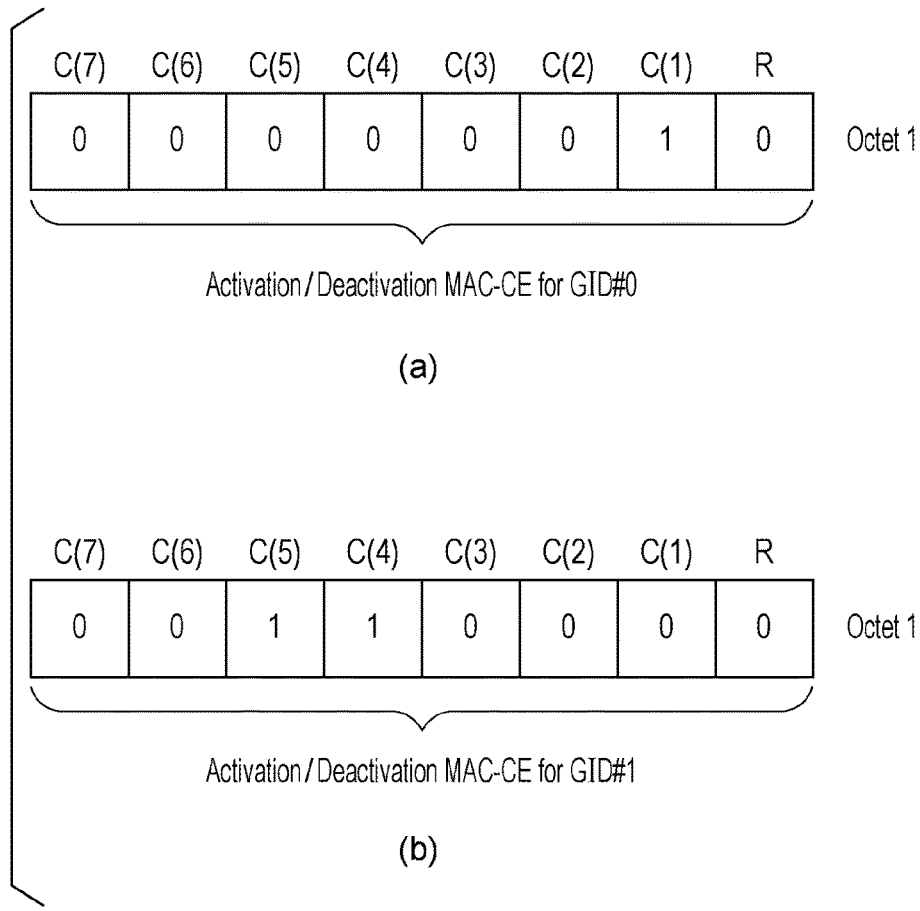
FIG. 8 is a view illustrating one example of bit allocation in control elements used for controlling a state of a cell according to the second embodiment of the invention.

Referring to FIG. 7 and FIG. 8, procedure of controlling activation and deactivation of a secondary cell, which is associated with the second embodiment of the invention, will be described. A format of control elements used for controlling the state of the cell, which is associated with the second embodiment, is the same as that of FIG. 9.

FIG. 7 is a view for explaining one example of allocation of cells and cell indexes according to the second embodiment of the invention. To the terminal apparatus 1, a cell 1, a cell 2, a cell 3, and a cell 4 are configured by the base station apparatus 2 for connection by the dual connectivity. Here, the cell 1 is a primary cell (PCell), the cell 2 is a secondary cell #0 (SCell #0), the cell 3 is a secondary cell #1 (SCell #1), and the cell 4 is a secondary cell #2 (Scell #2).

Moreover, for example, as to a serving cell index indicating an index number of a serving cell, the cell 1 has a serving cell index #0, the cell 2 has a serving cell index #1, the cell 3 has a serving cell index #4 and the cell 4 has a serving cell index #5, and as to a secondary cell index (SCell index) indicating an index number of a secondary cell, the cell 2 has a secondary cell index #1 (SCell index #1), the cell 3 has a secondary cell index #4 (SCell index #4), and the cell 4 has a secondary cell index #5 (SCell index #5).

The cell 1 and the cell 2 are cells managed by the base station apparatus 2-1 in FIG. 10 or FIG. 11 and are typically macro cells. On the other hand, the cell 3 and the cell 4 are cells managed by the base station apparatus 2-2 in FIG. 10 or FIG. 11 and are typically small cells. The cell 1 and the cell 2 belong to a first cell group (master cell group, MeNB Group) used by the terminal apparatus 1 for connection to the base station apparatus 2-1, and has a group ID of, for example, GID #0. The cell 3 and the cell 4 belong to a second cell group (secondary cell group, SeNB Group) used by the terminal apparatus 1 for connection to the base station apparatus 2-2, and has a group ID of, for example, GID #1.

Note that, numbers allocated to a cell configuration other than that of FIG. 7, that is, the serving cell index, the secondary cell index, and the group ID are not limited to those in the example of FIG. 7. However, the serving cell index and the secondary cell index need to be the same number and need to be a number which is unique for each cell to the terminal apparatus 1.

FIG. 8 is a view for explaining one example of configured bits when activation/deactivation is controlled for allocation of the secondary cells (cell configuration) illustrated in FIG. 7.

FIG. 8(a) illustrates an example of a configured bit when the cell 2 belonging to the master cell group is activated. Specifically, the base station apparatus 2 sets "1" indicating activation to a field of C(1) corresponding to the secondary cell index (SCell index #1) of the cell 2. Since the cell 3 and the cell 4 belonging to the secondary cell group are out of the target of the control, the base station apparatus 2 sets "0 (zero)" to a field of C(5) and a field of C(4). Since there is no other secondary cell, all of the remaining is set as "0 (zero)".

Here, the base station apparatus 2-1 transmits to the terminal apparatus 1 an MAC information element illustrated in FIG. 8(a) with an activated cell among cells belonging to GID #0. When having received the MAC information element illustrated in FIG. 8(a) with the cells belonging to GID #0, the terminal apparatus 1 judges (decides, determines) that only the cells belonging to GID #0 are the target of the control for the state of the cell.

When having received the MAC information element illustrated in FIG. 8(a) with the cells belonging to GID #0, the terminal apparatus 1 judges that the cell 2 belonging to GID #0 is the target of the control for the state of the cell, and the cell 3 and the cell 4 belonging to GID #1 are out of the target of the control for the state of the cell. That is, even when the cell 3 and the cell 4 are activated, the terminal apparatus 1 does not deactivate the cell 3 and the cell 4 in response to the MAC information element illustrated in FIG. 8(a).

FIG. 8(b) illustrates an example of a configured bit when the cell 3 and the cell 4 belonging to the secondary cell group are activated. Specifically, the base station apparatus 2 sets "1" indicating activation to the field of C(4) and the field of C(5) which respectively correspond to the secondary cell indexes (SCell index#1) of the cell 3 and the cell 4. Since the cell 2 belonging to the master cell group is out of the target of the control, the base station apparatus 2 sets "0 (zero)" to the field of C(1). Since there is no other secondary cell, all of the remaining is set as "0 (zero)".

Here, the base station apparatus 2-2 transmits to the terminal apparatus 1 an MAC information element illustrated in FIG. 8(b) with an activated cell among cells belonging to GID #1. When having received the MAC information element illustrated in FIG. 8(b) with the cells belonging to GID #1, the terminal apparatus 1 judges (decides, determines) that only the cells belonging to GID #1 are the target of the control for state of the cell.

When having received the MAC information element illustrated in FIG. 8(b) with the cells belonging to GID #1, the terminal apparatus 1 judges that the cell 3 and the cell 4 belonging to GID #1 are the target of the control for the state of the cell, and the cell 2 belonging to GID #0 is out of the target of the control for the state of the cell. That is, even when the cell 2 is activated, the terminal apparatus 1 does not deactivate the cell 2 in response to the MAC information element illustrated in FIG. 8(b).

In this manner, the terminal apparatus 1 judges that a cell to be a target of the control for the state of the cell is limited to cells of a cell group corresponding (associated with) the cell which has received the MAC control element for instructing activation and/or deactivation, and performs processing of activation and/or deactivation for the secondary cell of the cell group.

Note that, the terminal apparatus 1 may be configured to perform the control described above when being connected to the base station apparatus 2 by using the dual connectivity in the terminal apparatus 1 and not to perform the control described above when not being connected to the base station apparatus 2 by using the dual connectivity. That is, when being connected to the base station apparatus 2 by using the dual connectivity, the terminal apparatus 1 limits the cell to be the target of the control to a cell group to which the cell, which has received the MAC control element, belongs, while judges all the cells as the target of the control, when not being connected to the base station apparatus 2 by using the dual connectivity. Moreover, the terminal apparatus 1 may be configured to judge whether or not to perform the control described above based on information designated with an RRC message.

In addition, the base station apparatus 2 and the terminal apparatus 1 may perform the control for the state of the cell also with a method other than what is described above. For example, it may be configured that by using a bit of a field of R of FIG. 8 as information indicating a range of the cell to be the target, a command by which all groups are set as the target of the control for the state of the cell and a command by which only a group to which the cell which has performed the reception belongs is set as the target of the control for the state of the cell may be switched. In other words, switching may be performed as to whether the received command is the command by which all secondary cells are set as the target of the control for the state of the cell or the command by which only secondary cells of a group to which the cell which has performed the reception belongs are set as the target of the control for the state of the cell, depending on the bit configured to the field of R.

That is, in a case where the field of R illustrated in FIG. 8 is used as a field for instructing a group of cells to be the target, it may be configured so that when the bit is "0 (zero)", it is regarded as a command by which all groups with a conventional method are the target of the control for the state of the cell, and when the bit is "1", it is regarded as a command by which only the group to which the cell which has performed the reception belongs is the target of the control for state of the cell.

For example, when the field of R of FIG. 8(*a*) is "0", the terminal apparatus 1 performs the control with the secondary cells of all GID (GID #0 and GID #1 in FIG. 7) as the target. That is, activation is performed for the cell #1 corresponding to C(1) and deactivation is performed for the cells corresponding to C(2) to C(7). On the other hand, when the field of R of FIG. 8(*a*) is "1", the terminal apparatus 1 performs the control with the secondary cell of the group to which the cell which has performed the reception belongs as the target. That is, when the cell which has performed the reception is the cell belonging to GID #1, the terminal apparatus 1 does not set the cell of GID #0 as the target for activation and/or deactivation, performs activation of the cell of GID #1 corresponding to C(1), and performs deactivation of the cells of GID #1, which correspond to C(2) to C(7).

Such a configuration allows the terminal apparatus 1 and the base station apparatus 2 to solve a problem of inconsistency of the state, which is caused by that information of the state (activation, deactivation) of a secondary cell is not transferred (exchanged) between the base station apparatus 2-1 and the base station apparatus 2-2, in particular, a problem that a secondary cell which is not used, that is, a secondary cell which is deactivated is activated and a secondary cell which is used, that is, a secondary cell which is activated is deactivated.

Even when the state of the secondary cell is changed, it becomes unnecessary to exchange (transmit/receive) information about the state of the secondary cell between the base station apparatus 2-1 and the base station apparatus 2-2. Further, since a conventional MAC information element indicating activation and/or deactivation is able to be reused, it is possible to minimize influence on the terminal apparatus 1.

The terminal apparatus 1 of the present embodiment becomes possible to perform the control for the state of the cell independently, which does not affect states of cells of other groups, based on the cell group to which the cell which has received the MAC control element belongs. Further, the base station apparatus 2 of the present embodiment becomes possible to notify the terminal apparatus 1 of information which allows the control for the state of the cell without affecting states of cells of other groups, which is adaptive to a method for connecting the terminal apparatus 1 to a plurality of cells, by changing a transmission destination of the MAC control element according to the cell group to which the cell to be the target of the control belongs. That is, the base station apparatus 2 becomes possible to cause the terminal apparatus 1 to carry out procedure of efficiently controlling the state of the cell in a network in which a delay is caused in a backbone line between the base station apparatuses 2.

According to the second embodiment, with a command for instructing activation and/or deactivation of a secondary cell, the terminal apparatus 1 may appropriately control states of activation and deactivation of a cell based on the cell group to which the cell which has received the command transmitted from the base station apparatus 2 belongs, so that the procedure of controlling the state of the cell becomes efficient. Further, the base station apparatus 2 may provide procedure of controlling the state of the cell without inconsistency of the state between the base station apparatus 2 and the terminal apparatus 1 by transmitting to the terminal apparatus 1, with a cell in a cell group to which the cell to be controlled belongs, the command for instructing activation and/or deactivation of the secondary cell, thus making it possible to prevent reduction in throughput by performing efficient scheduling for the terminal apparatus 1.

Note that, the embodiments described above are only exemplifications, and may be realized by using various modified examples and substitution examples. For example, the uplink transmission scheme may be applied also to communication systems of both an FDD (frequency division duplex) scheme and a TDD (time division duplex) scheme. In addition, respective parameter names indicated in the embodiments are given for convenience of description, and even when parameter names in practical use and parameter names of the embodiments of the invention are different, there is no influence on the gist of the invention which is claimed by the embodiments of the invention.

"Connection" used in the description is not limited only to a configuration in which a certain apparatus and a certain different apparatus are directly connected by using a physical line, and also includes a configuration of logical connection and a configuration of wireless connection by using wireless technologies.

The terminal apparatus 1 includes not only a portable or movable mobile station apparatus, but also stationary or unmovable electronic equipment which is installed indoors and outdoors such as, for example, AV equipment, kitchen equipment, a cleaning/washing machine, air conditioning equipment, office equipment, an automatic vending machine, other domestic equipment, measurement equipment, and an in-vehicle apparatus.

The terminal apparatus 1 is also referred to as a user terminal, a mobile station apparatus, a communication terminal, a moving body, a terminal, UE (User Equipment), or an MS (Mobile Station). The base station apparatus is also referred to as a radio base station apparatus, a base station, a radio base station, a fixed station, NB (NodeB), eNB (evolved NodeB), a BTS (Base Transceiver Station), or a BS (Base Station).

Note that, the base station apparatus 2 in UMTS which is prescribed by 3GPP is referred to as NB, and the base station apparatus 2 in the EUTRA and the advanced EUTRA is referred to as eNB. Note that, the terminal apparatus 1 in the UMTS prescribed by 3GPP, the EUTRA, and the Advanced EUTRA is referred to as UE.

Further, though description has been given for the terminal apparatus 1 and the base station apparatuses 2 of the embodiments by using functional block diagrams for convenience of description, as to steps of a method, means or algorithm for realizing functions or a part of functions of each unit of the terminal apparatus 1 and the base station apparatuses 2, they may be embodied directly in hardware, in a software module executed by a processor, or in a combination of these two.

If being implemented in software, the function may be held or transmitted as one or more commands or codes on a computer readable medium. The computer readable media include both communication media and computer recording media including a medium that facilitates transferring a computer program from one place to another place.

Then, control of the terminal apparatus 1 and the base station apparatuses 2 may be performed by recording one or more commands or codes in a computer readable recording medium and causing a computer system to read the one or more commands or codes recorded in this recording medium for execution. Note that, the "computer system" here is set to include an OS and hardware such as peripheral equipment.

Operations described in each of the embodiments of the invention may be realized by a program. The program which is operated at the terminal apparatus 1 and the base station apparatuses 2 related to each of the embodiments of the invention is a program which controls a CPU or the like so as to realize the functions of the aforementioned embodiments related to each of the embodiments of the invention (program causing a computer to function). In addition, information handled in these apparatuses is temporarily accumulated in a RAM during processing thereof, and then stored in various ROMs or HDDs to be read out by the CPU as necessary, for correction and writing.

In addition, although the functions of the embodiments described above are realized by executing the program, the functions of each of the embodiments of the invention are also realized in some cases by performing processing based on instructions of the program in conjunction with an operating system, other application programs or the like.

Moreover, the "computer readable recording medium" refers to a portable medium such as a semiconductor medium (for example, such as a RAM or a nonvolatile memory card), an optical recording medium (for example, such as a DVD, an MO, an MD, a CD or a BD), a magnetic recording medium (for example, a magnetic tape or a flexible disk), or a storage apparatus including a disc unit embedded in a computer system. Further, the "computer readable recording medium" includes one which dynamically holds a program for a short time, such as a communication line in a case where the program is transmitted through a network such as the Internet or a communication line such as a telephone line, and one which holds a program for a fixed time, such as a volatile memory inside a computer system serving as a server or a client in the above case.

The aforementioned program may be one for realizing a part of the functions described above, and further may be one capable of realizing the functions described above by being combined with a program which has been already recorded in a computer system.

Each functional block or various features of the terminal apparatus 1 and the base station apparatuses 2 used in each of the embodiments described above may be implemented or executed by a general-purpose processor, a digital signal processor (DSP), an application specific or general application integrated circuit (ASIC), a field programmable gate array signal (FPGA), or other programmable logic apparatuses, discrete gates or transistor logic, a discrete hardware component, which is designed to execute the functions described in the present specification, or a combination thereof.

The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit.

The processor may be implemented also as a combination with a computing apparatus. For example, a DSP and a microprocessor, a plurality of microprocessors, one or more microprocessors connected to a DSP core, or other such configurations are combined.

As above, the embodiments of the invention have been described in detail based on specific examples, however, it is clear that a gist of each embodiment and a scope of Claims of the present invention are not limited to these specific examples, and design change and the like which are not departed from the gist of the invention are also included. That is, the description in the present specification aims to give exemplary description and does not give any limitation to each embodiment of the present invention.

The invention can be modified in various manners within the scope defined by the Claims, and embodiments obtained by appropriately combining technical means disclosed in different embodiments are also encompassed by the technical scope of the invention. The configuration in which elements described in each of the aforementioned embodiments and achieving similar effects are replaced with each other is also encompassed in the technical scope of the invention.

DESCRIPTION OF REFERENCE NUMERALS 1 terminal apparatus
2, 2-1, 2-2 base station apparatus
101, 201 reception unit
102, 202 demodulation unit
103, 203 decoding unit
104 measurement processing unit
105, 204 control unit
106 uplink buffer control unit
107, 205 coding unit
108, 206 modulation unit
109, 207 transmission unit
110 uplink radio resource request control unit 111 random access control unit
112, 208 higher layer unit
209 network signal transmission/reception unit
300 MME
400 SGW

The invention claimed is:

1. A terminal apparatus configured to communicate with a base station apparatus, the terminal apparatus comprising:

first circuitry configured and/or programmed to:
configure a master cell group or a secondary cell group, in dual connectivity, based on control information received from the base station apparatus, the master cell group including a first primary cell and one or more first secondary cell, and the secondary cell group including a second primary cell and one or more second secondary cell,
change a state of the first secondary cell and not changing a state of the second secondary cell in a case where a control element indicating a state of a cell is received on a cell of the master cell group, and
change a state of the second secondary cell and not changing a state of the first secondary cell in a case where the control element is received on a cell of the secondary cell group,
wherein the state of the first secondary cell or the second secondary cell is changed to activation or deactivation based on the control element.

2. A base station apparatus configured to communicate with a terminal apparatus, the base station apparatus comprising:

first circuitry configured and/or programmed to:
transmit control information for configuring a master cell group or a secondary cell group, in dual connectivity, the master cell group including a first primary cell and one or more first secondary cell, and the secondary cell group including a second primary cell and one or more second secondary cell,
transmit a control element indicating a state of a cell, to a cell of the master cell group, in a case that the state of the first secondary cell is changed and the state of the second secondary cell is not changed, and
transmit the control element to a cell of the secondary cell group, in a case that the state of the second secondary cell is changed and the state of the first secondary cell is not changed,
wherein the state of the first secondary cell or the second secondary cell is changed to activation or deactivation based on the control element.

3. A control method of a terminal apparatus configured to communicate with a base station apparatus, the control method comprising:

configuring a master cell group or a secondary cell group, in dual connectivity, based on control information received from the base station apparatus, the master cell group including a first primary cell and one or more first secondary cell, and the secondary cell group including a second primary cell and one or more second secondary cell,
changing a state of the first secondary cell and not changing a state of the second secondary cell in a case where a control element indicating a state of a cell is received on a cell of the master cell group, and
changing a state of the second secondary cell and not changing a state of the first secondary cell in a case where the control element is received on a cell of the secondary cell group,
wherein the state of the first secondary cell or the second secondary cell is changed to activation or deactivation based on the control element.

4. A control method of a base station configured to communicate with a terminal apparatus, the control method comprising:

transmitting control information for configuring a master cell group or a secondary cell group, in dual connectivity, the master cell group including at least a first primary cell and one or more first secondary cell, and the secondary cell group including at least a second primary cell and one or more second secondary cell,
transmitting a control element indicating a state of a cell to a cell of the master cell group, in a case that the state of the first secondary cell is changed and the state of the second secondary cell is not changed, and
transmitting the control element to a cell of the secondary cell group, in a case that the state of the second secondary cell is changed and the state of the first secondary cell is not changed,
wherein the state of the first secondary cell or the second secondary cell is changed to activation or deactivation based on the control element.

* * * * *